(12) United States Patent
Bakan et al.

(10) Patent No.: US 11,757,376 B2
(45) Date of Patent: Sep. 12, 2023

(54) DEAD-TIME CONTROL METHOD FOR POWER ELECTRONICS CONVERTERS AND A CIRCUIT FOR THE APPLICATION OF THIS METHOD

(71) Applicant: YILDIZ TEKNIK UNIVERSITESI, Istanbul (TR)

(72) Inventors: Ahmet Faruk Bakan, Istanbul (TR); Ahmet Talha Dudak, Istanbul (TR)

(73) Assignee: YILDIZ TEKNIK UNIVERSITESI, Istanbul (TR)

( * ) Notice: Subject to any disclaimer, the term of this patent is extended or adjusted under 35 U.S.C. 154(b) by 258 days.

(21) Appl. No.: 17/320,226

(22) Filed: May 14, 2021

(65) Prior Publication Data
US 2021/0376761 A1    Dec. 2, 2021

Related U.S. Application Data

(63) Continuation of application No. PCT/TR2019/051022, filed on Dec. 3, 2019.

(51) Int. Cl.
*H02M 7/5387* (2007.01)
*H02M 1/38* (2007.01)
(Continued)

(52) U.S. Cl.
CPC ..... *H02M 7/53873* (2013.01); *H02M 1/0012* (2021.05); *H02M 1/123* (2021.05);
(Continued)

(58) Field of Classification Search
CPC ............. H02M 7/53873; H02M 1/385; H02M 1/0012; H02M 1/126; H02M 1/32
See application file for complete search history.

(56) References Cited

U.S. PATENT DOCUMENTS

| 4,739,465 A | 4/1988 | Asano et al. |
| 5,093,771 A | 3/1992 | Harvest |

(Continued)

FOREIGN PATENT DOCUMENTS

| CN | 104868775 A | 8/2015 |
| CN | 106803684 A | 6/2017 |

(Continued)

OTHER PUBLICATIONS

Bakan A.et all: "Implementation of digital adaptive hysteresis current control technique"; 2017, 10th International Confereference on Electrical and Electronics Engineering; Nov. 30, 2017, pp. 416-422.

*Primary Examiner* — Adolf D Berhane
(74) *Attorney, Agent, or Firm* — Andrzej Malarz, Esq.

(57) ABSTRACT

A dead time control method (100) comprising the steps of: converting the DC link voltage, output current and output voltage to digital values with an ADC (Analog to Digital converter) (102); calculating the hysteresis band for adaptive hysteresis current control using the values read by the ADC and updating the band value via recalculating it at each sampling time (103); calculating the IrefH and IrefL values using the hysteresis band and Iref (103a); generating the PWM signal by hysteresis current control (104), generating two auxiliary control signals as VP, VN (105); in the region where VP=1 and VN=0, applying of the drive signal of $T_1$ without setting dead time wherein $T_1$ is the conduction duration of an upper switch, and not applying the drive signal of $T_2$ wherein $T_2$ is the turn off duration of said upper switch and is the conduction duration of a lower switch (106).

9 Claims, 10 Drawing Sheets

(51) Int. Cl.
  *H02M 1/00* (2006.01)
  *H02M 1/12* (2006.01)
  *H02M 1/32* (2007.01)

(52) U.S. Cl.
  CPC ............ *H02M 1/126* (2013.01); *H02M 1/32* (2013.01); *H02M 1/385* (2021.05)

(56) References Cited

U.S. PATENT DOCUMENTS

| | | |
|---|---|---|
| 5,867,380 A | 2/1999 | Lee |
| 2010/0172167 A1 | 7/2010 | Ye |
| 2013/0102781 A1 | 4/2013 | Bevill et al. |
| 2015/0131352 A1* | 5/2015 | Hart ................ H02M 7/537 363/131 |
| 2016/0211772 A1 | 7/2016 | Degner et al. |
| 2018/0198401 A1 | 7/2018 | Thongam et al. |
| 2020/0127316 A1 | 4/2020 | Naito et al. |
| 2022/0140747 A1* | 5/2022 | Tajima ................ H02M 1/088 307/52 |

FOREIGN PATENT DOCUMENTS

| | | |
|---|---|---|
| CN | 106849177 A | 6/2017 |
| CN | 106849731 A | 6/2017 |
| KR | 100347758 | 8/2002 |
| WO | 2011037509 A1 | 3/2011 |
| WO | 2013102781 A1 | 7/2013 |

\* cited by examiner

PRIOR ART

DEAD-TIME CONTROL METHOD FOR POWER ELECTRONICS CONVERTERS AND A CIRCUIT FOR THE APPLICATION OF THIS METHOD

TECHNICAL FIELD

This invention relates to a dead time control method for use in power electronics converters and to a circuit developed for implementation of this method.

PRIOR ART

Brief Description of the Problem

Hysteresis current control or PWM (pulse width modulation) methods are used for current control in inverters. In the hysteresis current control method, the inverter current is controlled such that it remains in the upper and lower band defined around the reference current. Dead time is set between the signals to prevent short-circuit of the elements in the phase arm in inverters. Due to the dead time set, the current extends beyond the hysteresis band. In this case, the current control is disrupted.

Prior Art Practices

Dead time is set between the signals to prevent short-circuit of the elements in the phase arm in inverters. The dead time, which must be set between the drive signals of the semiconductor power switches, leads to disturbances in current and voltage control. Dead time compensation methods have been developed to prevent this degradation. Dead time compensation in PWM methods has been extensively discussed in literature and patents. Dead time compensation stands out in inverter applications and improves the quality of the output voltage and current. The dead time set between the drive signals of the upper and lower switches in a phase arm causes the inverter output voltage to be different than the desired value according to the polarity of the current. In order to prevent this, the load ratio according to the polarity of the current, is increased or decreased in the amount of dead time in the PWM generation stage.

Many studies have been conducted in the context of dead time in PWM methods. These studies are related to the dead time problem but are not developed for the hysteresis current control method and therefore are different from the present invention. In [1]-[3], the problem of output current and voltage waveform distortion is tried to be eliminated by a dead time compensation technique. In [4], dead time compensation was performed with a snubber circuit. Hybrid compensation techniques including feedback and feed forward are presented in [5]-[8]. In the method proposed in [9] and [10], the dead time effect was compensated using the 6th harmonic component. In [11]-[16] estimation-based approaches are presented, in [17]-[19] the effect of dead time is studied in predictive current control. In [20] and [21], the dead time compensation technique was performed using parameters measured using an analog to digital converter. In [22]-[25] the dead time compensation technique was performed by considering the parasitic capacity of the power element. Pulse-based dead time compensation technique is applied in [25]-[27]. In [28] and [29], the dead time effect is presented for the parabolic current control method. Repetitive approaches are presented in [30] and [31]. Vector-based in [32], ADALINE-based in [33], variable switching frequency based in [34], with adjustable compensation factor in [35], sine PWM-based with three triangles in [36] and in [37] approaches of dynamic dead time optimization methods have been implemented. A dead time compensation technique using logic circuits is presented in [38] and [39]. The method proposed in [40] is presented for low common mode voltage. In [41], the dead time effect was tried to be eliminated by means of a simple calculation. In [42], a study was made using H6 topology without dead time modulation algorithm. In [43]-[46] elimination techniques are present for the dead time effect. These methods eliminate the dead time effect via determining the direction of current by means of a circuit.

In the context of hysteresis current control, studies have been carried out in the literature to keep the switching frequency constant and solve the dead time problem. These studies were compared with the invention proposal and no direct similarity was determined. In [47], an estimation-based method has been developed to formulate the switching function with current reference, dynamic behavior and past time information of the system. The method comprises a very complex hardware. Calculation is done with analog circuit. The use of many components increases the cost and makes the applicability difficult and decrease the reliability. In [48], a numerical control method is presented to keep the frequency constant in hysteresis current control. The method is adaptive to the load parameters and the input source. The dead time effect is compensated by the PI controller. In [49]-[51], a numerical method that automatically compensates the dead time effect is used. In [52] and [53], a study was carried out for single-phase three-level inverters. In [52], a method independent from the load parameters is proposed. This method obtains appropriate switching signals according to the upper/lower hysteresis bandwidth, current error and switching state, to eliminate the dead time effect without dead time compensation. In [53], two techniques are presented to stabilize the frequency at the zero crossing points of the grid. These techniques are mixed-level model and estimation-based sampling. In the mixed-level model, a transition from three-level state to two-level state is made around zero. Estimation-based sampling aims to achieve the most effective switching. In [54], the effect of change in the switching frequency and sampling frequency in the hysteresis band is analyzed. The difference between the maximum and minimum switching frequency of the fixed band hysteresis current control depends on the sampling frequency of the digital controller. But in here the dead time is neglected. In addition, there are some studies for three-phase systems [55], [56]. In [55], a space vector-based approach is presented. In [56], the average inverter output voltage is used as an approach to the back-emf value of the load for constant frequency hysteresis current control. In here the dead time delay is calculated and compensated by taking this delay into account.

There are patents granted based on dead time [57]-[61]. In [57]-[59], a dead-time method for a grid-connected boosting-reducing-volage inverter mode is proposed without remaining the need of using dead time. In [60], a dead time elimination method is presented using a simple logic circuit. An upper and lower limit according to the grid voltage and which switching signals will be generated according to these limits are determined in the method [61]. Two of the four switches used for this purpose are active at high frequency and two are active according to the positive and negative alternans of the grid at low frequency.

In the hysteresis current control method, the current is controlled instantaneously. The hysteresis current control is shown in a two-level voltage source inverter given in FIG.

1. The method can be used for applications such as the grid-connected inverter of FIG. 1.(a) and applications having a load such as the UPS of FIG. 1.(b). Dead time has adverse effects on hysteresis current control method. In hysteresis current control, the inductance current cannot be retained within the defined hysteresis band due to dead time (FIG. 6). This is due to the fact that the driving signal cannot be applied immediately when the current goes out of the hysteresis band and that the current continues to travel in the same direction as much as the dead time, especially in areas where the current changes rapidly. In proportion to the dead time set, the current extends beyond the hysteresis band and big amount of changes in frequency occurs.

In the simulations, it is seen that the hysteresis controller cannot keep the inductance current in the band if dead time is set. FIG. 7 shows the results for a constant band. The inductance current goes out of the lower band in the positive alternans and out of the upper band in the negative alternans. The change in frequency is around 10 kHz. The frequency ranges from 2 kHz to 12 kHz.

In adaptive hysteresis current control methods, the switching frequency is kept constant by changing the band. When this method is applied to inverters, the theoretically calculated band ensures that the frequency is kept constant. However, due to dead time, the current exceeds the calculated band and the frequency cannot be kept constant.

When it is aimed to keep the frequency constant at 10 kHz by applying the variable band, the results in FIG. 8 are obtained. In this case, the inductance current cannot be kept in the band again. The frequency fluctuation is quite high. The frequency change obtained by simulation when there is no dead time is indicated by fsw_(ref). According to this, frequency control is seriously deteriorating. The dead time has a negative effect on keeping the frequency constant. The method in FIG. 5 has been developed to solve this problem.

[1] J. W. Choi and S.-K. Sul, "A New—compensation Strategy Reducing Voltage Current Distortion in PWM VSI Systems Operating with Low Output Voltages," IEEE Trans. Ind. Appl., vol. 31, no. 5, pp. 1001-1008, September/October 1995.

[2] J. W. Choi and S.-K. Sul, "Inverter Output Voltage Synthesis Using Novel Dead Time Compensation," IEEE Trans. Power Electron., vol. 11, no. 2, pp. 221-227, March 1996.

[3] S.-G. Jeong and M.-H. Park, "The Analysis and Compensation of DeadTime Effects in PWM Inverters," IEEE Trans. Ind. Electron., vol. 38, no. 2, pp. 108-114, April 1991.

[4] D. Zhou and D. G. Rouaud, "Dead-Time Effect and Compensations of Three-Level Neutral Point Clamp Inverters for High-Performance Drive applications," IEEE Trans. Power Electron., vol. 14, no. 4, pp. 782-788, July 1999.

[5] J.-L. Lin, "A New Approach of Dead-Time Compensation for PWM Voltage Inverters," IEEE Trans. Circuits Syst. I, Fundam. Theory. Appl, vol. 49, no. 4, pp. 476-483, April 2002.

[6] A. R. Muñoz and T. A. Lipo, "On-Line Dead-Time Compensation Technique for Open-Loop PWM-VSI Drives." IEEE Trans. Power Electron., vol. 14, no. 4, pp. 683-689, July 1999.

[7] J. Jung and K. Nam, "A PI-Type Dead-Time Compensation Method for Vector-Controlled GTO Inverters," IEEE Trans. Ind. Appl., vol. 34, no. 3, pp. 452-457, May/June 1998.

[8] F. Blaabjerg, J. K. Pedersen and P. Thoegersen, "Improved Modulation Techniques for PWM-VSI Drives," IEEE Trans. Ind. Electron., vol. 44, no. 1, pp. 87-95, February 1997.

[9] S.-Y. Kim and S.-Y. Park, "Compensation of Dead-Time Effects Based on Adaptive Harmonic Filtering in the Vector-Controlled AC Motor Drives," IEEE Trans. Ind. Electron., vol. 54, no. 3, pp. 1768-1777, June 2007.

[10] S.-H. Hwang and J.-M. Kim, "Dead Time Compensation Method for Voltage-Fed PWM Inverter," IEEE Trans. Energy Convers., vol. 25, no. 1, pp. 1-10, March 2010.

[11] C. Attaianese and G. Tomasso, "Predictive Compensation of Dead-Time Effects in VSI Feeding Induction Motors," IEEE Trans. Ind. Appl., vol. 37, no. 3, pp. 856-863, May/June 2001.

[12] H.-S. Kim, H.-T. Moon and M.-J. Youn, "On-Line Dead-Time Compensation Method Using Disturbance Observer," IEEE Trans. Power Electron., vol. 18, no. 6, pp. 1336-1345, November 2003

[13] D.-M. Park and K.-H. Kim, "Parameter-Independent Online Compensation Scheme for Dead Time and Inverter Nonlinearity in IPMSM Drive Through Waveform Analysis," IEEE Trans. Ind. Electron., vol. 61, no. 2, pp. 701-707, February 2014.

[14] N. Urasaki, T. Senjyu, K. Uezato and T. Funabashi, "An Adaptive DeadTime Compensation Strategy for Voltage Source Inverter Fed Motor Drives," IEEE Trans. Power Electron. vol. 20, no. 5. pp. 1150-1160, September 2005.

[15] N. Urasaki. T. Senjyu, K. Uezato and T. Funabashi, "Adaptive DeadTime Compensation Strategy for Permanent Magnet Synchronous Motor Drive," IEEE Trans. Energy Convers., vol. 22, no. 2, pp. 271-280, June 2007.

[16] S.-Y. Kim, W. Lee, M.-S. Rho and S.-Y. Park, "Effective Dead-Time Compensation Using a Simple Vectorial Disturbance Estimator in PMSM Drives," IEEE Trans. Ind. Electron., vol. 57, no. 5, pp. 1609-1614, May 2010.

[17] T. J. Summers and R. E. Betz, "Dead-Time Issues in Predictive Current Control," IEEE Trans. Ind. Appl., vol. 40, no. 3, pp. 835-844, May/June 2004.

[18] U. Abronzini, C. Attaianese, M. D'Arpino, M. Di Monaco and G. Tomasso, "Steady-State Dead-Time Compensation in VSI," IEEE Trans. Ind. Electron., vol. 63, no. 1. pp. 5858-5866, September 2016.

[19] M. A. Heruin, J. R. Fischer, S. A. González, M. G. Judewicz and D. O. Carrica, "Adaptive Dead-Time Compensation for Grid-Connected PWM Inverters of Single-Stage PV Systems," IEEE Trans. Power Electron., vol. 28, no. 6, pp. 2816-2825, June 2013.

[20] A. Lewicki, "Dead-Time Effect Compensation Based on Additional Phase Current Measurements," IEEE Trans. Ind. Electron., vol. 62, no. 7, pp. 4078-4085, July 2015.

[21] G. Liu, D. Wang, Y. Jin, M. Wang and P. Zhang, "Current-Detection Independent Dead-Time Compensation Method Based on Terminal Voltage A/D Conversion for PWM VSI," IEEE Trans. Ind. Electron., vol. 64, no. 10, pp. 7689-7699, October 2017.

[22] N. Urasaki, T. Senjyu, T. Kinjo, T. Funabashi and H. Sekine, "Deadtime compensation strategy for permanent magnet synchronous motor drive taking zerocurrent clamp and parasitic capacitance effects into account," IEE Proc.-Electr. Power Appl., vol. 152, no. 4, pp. 845-853, July 2005.

[23] N. Bedetti, S. Calligaro and R. Petrella, "Self-Commissioning of Inverter Dead-Time Compensation by Multiple Linear Regression Based on a Physical Model," IEEE Trans. Ind. Appl., vol. 51, no. 5, pp. 3954-3964, September/October 2015.

[24] T. Mannen and H. Fujita, "Dead-Time Compensation Method Based on Current Ripple Estimation," IEEE Trans. Power Electron., vol. 30, no. 7, pp. 4016-4024, July 2015.

[25] Z. Zhang and L. Xu, "Dead-Time Compensation of Inverters Considering Snubber and Parasitic Capacitance," IEEE Trans. Power Electron., vol. 29, no. 6, pp. 3179-3187, June 2014.

[26] D. Leggate and R. J. Kerkman, "Pulse-Based Dead-Time Compensator for PWM Voltage Inverters," IEEE Trans. Ind. Electron., vol. 44, no. 2, pp. 191-197, April 1997.

[27] P. J. Patel, Vinod Patel and P. N. Tekwani, "Pulse-based dead-time compensation method for self balancing space vector pulse width modulated scheme used in a three-level inverter-fed induction motor drive," IET Power Electron., vol. 4, no. 6, pp. 624-631, 2011.

[28] L. Zhang. B. Gu, J. Dominic, B. Chen, C. Zheng and J.-S. Lai. "A DeadTime Compensation Method for Parabolic Current Control With Improved Current Tracking and Enhanced Stability Range," IEEE Trans. Power Electron., vol. 30, no. 7, pp. 3892-3902, July 2015.

[29] L. Zhang, H. Ma, R. Born, X. Zhao and J.-S. Lai, "Single-Step Current Control for Voltage Source Inverters With Fast Transient Response and High Convergence Speed," IEEE Trans. Power Electron., vol. 32, no. 11, pp. 8823-8832, November 2017.

[30] Z. Tang and B. Akin, "Suppression of Dead-Time Distortion Through Revised Repetitive Controller in PMSM Drives," IEEE Trans. Energy Convers., vol. 32, no. 3, pp. 918-930, September 2017.

[31] L. Ben-Brahim, "On the Compensation of Dead Time and Zero-Current Crossing for a PWM-Inverter-Controlled AC Servo Drive," IEEE Trans. Ind. Electron., vol. 51, no. 5, pp. 1113-1117, October 2004.

[32] X. Li, B. Akin and K. Rajashekara, "Vector-Based Dead-Time Compensation for Three-Level T-Type Converters," IEEE Trans. Ind. Appl., vol. 52, no. 2, pp. 1597-1607, March/April 2016.

[33] T. Qiu, X. Wen and F. Zhao, "Adaptive-Linear-Neuron-Based DeadTime Effects Compensation Scheme for PMSM Drives," IEEE Trans. Power Electron., vol. 31, no. 3, pp. 2530-2538, March 2016.

[34] A. C. Oliveira, C. B. Jacobina and A. M. N. Lima, "Improved DeadTime Compensation for Sinusoidal PWM Inverters Operating at High Switching Frequencies," IEEE Trans. Ind. Electron., vol. 54, no. 4, pp. 2295-2304, August 2007.

[35] H. Zhao, Q. M. J. Wu and A. Kawamura, "An Accurate Approach of Nonlinearity Compensation for VSI Inverter Output Voltage," IEEE Trans. Power Electron., vol. 19, no. 4, pp. 1029-1035, July 2004.

[36] C. Song, N. Diao, Z. Xue, X. Sun and J. Guan, "Tri-carrier sinusoidal pulse-width modulation without dead time effects for converters," IET Power Electron., vol. 8, no. 10, pp. 1941-1951, 2015.

[37] S. M. Tayebi, C. Jourdan and I. Batarseh, "Dynamic Dead-Time Optimization and Phase Skipping Control Techniques for Three-Phase Microinverter Applications," IEEE Trans. Ind. Electron., vol. 63, no. 12, pp. 7523-7532, December 2016.

[38] K. M. Cho, W. S. Oh, Y. T. Kim and H. J. Kim, "A New Switching Strategy for Pulse Width Modulation (PWM) Power Converters," IEEE Trans. Ind. Electron., vol. 54, no. 1, pp. 330-337, February 2007

[39] C. Attaianese, V. Nardi and G. Tomasso. "A Novel SVM Strategy for VSI Dead-Time-Effect Reduction," IEEE Trans. Ind. Appl., vol. 41, no. 6, pp. 1667-1674, November/December 2005.

[40] R. M. Cuzner, A. R. Bendre, P. J. Faill and B. Semenov, "Implementation of a Four-Pole Dead-Time-Compensated NeutralPoint-Clamped Three-Phase Inverter With Low Common-Mode Voltage Output," IEEE Trans. Ind. Appl., vol. 45, no. 2, pp. 816-826, March/April 2009.

[41] D.-H. Lee and J.-W. Ahn, "A Simple and Direct Dead-Time Effect Compensation Scheme in PWM-VSI," IEEE Trans. Ind. Appl., vol. 50, no. 5, pp. 3017-3025, September/October 2014.

[42] K. Xia, Y. Tian, J. Lu, Y. Ge and C. Bi, "No dead-time modulation algorithm for an offgrid inverter based on H6 topology," IET Power Electron., vol. 11, no. 3, pp. 1-9, November 2017.

[43] Y.-K. Lin and Y.-S. Lai, "Dead-Time Elimination of PWM-Controlled Inverter/Converter without Separate Power Sources for Current Polarity Detection Circuit," IEEE Trans. Ind. Electron., vol. 56, no. 6, pp. 2121-2127, June 2009.

[44] Y. Wang, Q. Gao, and X. Cai, "Mixed PWM for Dead-Time Elimination and Compensation in a Grid-Tied Inverter," IEEE Trans. Ind. Electron., vol. 58, no. 10, pp. 4797-4803, October 2011.

[45] L. Chen and F. Z. Peng, "Dead-Time Elimination for Voltage Source Inverters," IEEE Trans. Power Electron., vol. 23, no. 2, pp. 574-580, March 2008.

[46] J. Yuan, Z. Zhao, B. Chen, C. Li, J. Wang, C. Tian and Y. Chen, "An Immune-Algorithm-Based Dead-Time Elimination PWM Control Strategy in a Single-Phase Inverter," IEEE Trans. Power Electron., vol. 30, no. 7, pp. 3964-3975, July 2015.

[47] C. N.-M. Ho, V. S. P. Cheung and H. S.-H. Chung, "ConstantFrequency Hysteresis Current Control of Grid-Connected VSI Without Bandwidth Control," IEEE Trans. Power Electron., vol. 24, no. 11, pp. 2484-2495, November 2009.

[48] L. Malesani, L. Rossetto, P. Tomasin, and A. Zuccato, "Digital Adaptive Hysteresis Current Control with Clocked Commutations and Wide Operating Range," IEEE Trans. Ind. Appl., vol. 32, no. 2. pp. 316-325, March/April 1996.

[49] S. Buso, S. Fasolo, L. Malesani and P. Mattavelli, "A Dead-Beat Adaptive Hysteresis Current Control," IEEE Trans. Ind. Appl., vol. 36, no. 4, pp. 1174-1180, July/August 2000.

[50] W. Stefanutti and P. Mattavelli, "Fully Digital Hysteresis Modulation With Switching-Time Prediction," IEEE Trans. Ind. Appl., vol. 42, no. 3, pp. 763-769, May/June 2006.

[51] S. Buso and T. Caldognetto, "A Nonlinear Wide-Bandwidth Digital Current Controller for DC-DC and DC-AC Converters," IEEE Trans. Ind. Electron., vol. 62, no. 12, pp. 7687-7695, December 2015.

[52] H. Mao, X. Yang, Z. Chen and Z. Wang, "A Hysteresis Current Controller for Single-Phase Three-Level Voltage Source Inverters," IEEE Trans. Power Electron., vol. 27, no. 7, pp. 3330-3339, July 2012.

[53] H. Yi, F. Zhuo, F. Wang and Z. Wang, "A Digital Hysteresis Current Controller for Three-Level Neural-Point-Clamped Inverter With Mixed Levels and Prediction-Based Sampling," IEEE Trans. Power Electron., vol. 31, no. 5, pp. 3945-3956, May 2016.

[54] M. Kumar and R. Gupta, "Sampled-TimeDomain Analysis of a Digitally Implemented Current Controlled Inverter," IEEE Trans. Ind. Electron., vol. 64, no. 1, pp. 217-227. January 2017.
[55] J. A. Suul, K. Ljskelsoy, T. Midtsund, and T. Undeland, "Synchronous Reference Frame Hysteresis Current Control for Grid Converter Applications," IEEE Trans. Ind. Appl., vol. 47, no. 5, pp. 2183-2194, September/October 2011.
[56] D. G. Holmes, R. Davoodnezhad and B. P. McGrath, "An Improved Three-Phase Variable-Band Hysteresis Current Regulator," IEEE Trans. Power Electron., vol. 28, no. 1, pp. 441-450, January 2013.
[57] CN106803684A patent
[58] CN106849177A patent
[59] CN106849731A patent
[60] KR100347758B1 patent
[61] CN104868775A patent

BRIEF DESCRIPTION OF THE INVENTION

The object of the present invention is to provide a dead time control method for power electronics elements and a circuit for implementing this method.

The invention is is a dead time control method (100) for hysteresis current control in power electronics converters, comprising the following steps; With this method, an application circuit, comprising switches (T1 and T2), is controlled.

Converting the DC link voltage, output current and output voltage to digital values with an ADC (Analog to Digital converter) (102), Calculation of the hysteresis band for adaptive hysteresis current control using the values read by the ADC and updating the band value by recalculating it at each sampling time (103), Calculation of the IrefH and IrefL values of the upper and lower bands of the current reference using the hysteresis band and Iref (103a).

Generating the PWM signal by hysteresis current control (104),

Generating two auxiliary control signals as VP, VN (105),

In the region where VP=1 and VN=0, a drive signal of T1 is applied without setting dead time, and a drive signal of T2 is not applied wherein T1 is a conduction time duration of an upper switch and T2 is a turn off time duration of said upper switch and the conduction time duration of a lower switch (106), In the region where VP=0 and VN=1, the driving signal of T2 is applied without setting dead time and the driving signal of T1 is not applied (107), Applying the driving signals of T1 and T2 via setting dead time in the region where VP=1 and VN=1 (108).

In this method, the hysteresis band in the step 103, i.e "Calculation of the hysteresis band for adaptive hysteresis current control using the values read by the ADC and updating the band value by recalculating it at each sampling time", is obtained according to the formula:

$h = (T\_p \cdot (m\_2 + m\_ref) \cdot (m\_1 - m\_ref))/(m\_1 + m\_2)$ and $\Delta I = h/2$ wherein: $T\_p$ is the switching period; $\Delta I$ is the hysteresis band; h is the amount of fluctuation in the current; $m\_1$ is the slope of the inductance current within time t1; $m\_2$ is the absolute value of the slope of the inductance current within time t2; $m\_ref$ is the slope value of the current reference.

In step "generating two auxiliary control signals as VP, VN (105)" of this method, furthermore, auxiliary control signals (VP, VN) are generated taking into account the regions wherein the upper and lower band of the current reference (i.e. IrefL and IrefH) are positive and negative.

In step "generating two auxiliary control signals as VP, VN (105)" of this method elsemore, the first of the auxiliary control signals (VP) is generated when the upper band (IrefH) is positive and the second (VN) is generated when the lower band (IrefL) is negative.

The invention is further a dead time control circuit (2 or 2' or 2") for carrying out this method (100); comprising:

a processor (10) converting the read analog values of the voltage and current into digital values; calculating the hysteresis bandwidth value and updating the bandwidth value via recalculating it in each sampling time; generating upper and lower band values (IrefH, IrefL) via adding and subtracting the bandwidth value to/from the current reference (Iref), generating the PWM signal relative to the hysteresis band; generating two auxiliary control signals, as one of which is VP when the upper band IrefH is positive and the other is VN when the lower band IrefL is negative and a logic circuit and a simulation circuit (1) generating driving signals of PWMH_ and PWML_.

This dead time control circuit (2) comprises a dead time control circuit (2); AND gate (211), transistor (222), MOSFET (223) and resistors (221). This dead time control circuit comprises 4 AND gates (211), 2 NPN transistors (222), 1 MOSFET (223) and at least 8 resistors (221).

This dead time control circuit (2) can also be carried out equaivalently with other dead time control circuits. Equivalent dead time control circuits (2' or 2" or 2'" (the alternative of 2'" is not shown in the figures)); is composed of with an FPGA and/or a CPLD and/or a DAC and/or a comparator and/or logic elements.

The equivalent dead time control circuit (2' or 2") comprises resistors (221), capacitors (225), diodes (224), and a NOT gate (212).

In this dead time control method, the signals are generated via setting dead time between the gate signals of the lower and upper switches at the zero crossing region of the output current where the first auxiliary control signal (VP) is logic 1 and the second auxiliary control signal (VN) is logic 1, and all of the power switches (T1 and T2) are switched.

In the method according to the invention, there is a processor, converting the voltage and current analog values into digital values; calculating the hysteresis bandwidth value and updating the bandwidth value by recalculating it in each sampling time; generating PWM signal according to hysteresis band; after generating the PWM signal, generating two auxiliary control signals, being the first (VP) generated when the upper band IrefH is positive, being the second (VN) generated when the lower band (IrefL) is negative and generating upper and lower band values (IrefH, IrefL) via adding and subtracting the bandwidth value to/from the current reference (Iref).

The invention is also a circuit composed of two AND gates to which such processor is connected to with a NOT gate, thereby will be used in the input of a dead time circuit and thereby produces a rearranged PWM drive signal (PWMH and PWML).

In this circuit, PWMH and PWML signals are generated, which are the re-arranged PWM signal, as the input signal, to be PWM logic 0 when the output current passes the upper band (IrefH), and to be PWM logic 1 when current passes the lower band (IrefL).

The invention is also a dead time control circuit for performing the aforementioned method and for connecting to the output of the aforementioned circuit. This dead time control circuit comprises 4 AND gates, 2 NPN transistors, 1 MOSFET and resistors and generates driving signals (PWMH_ and PWML_) to add dead time in a power electronics application circuit. In this dead time control circuit, a PWM signal generated in the above-described circuit is applied to the input of the MOSFET, an EN_L signal is applied to an input terminal of a first AND gate, and an EN_H signal is applied to an input terminal of a fourth AND gate. In this dead time control circuit furthermore;

if the PWM signal applied to the input of MOSFET is not active, the output of all AND gates is logic 0 and this operation mode occurs in the case where the EN_H signal applied to a terminal of a fourth AND gate is logic 1 and the EN_L signal applied to a terminal of a first AND gate is logic 0, if the PWM signal applied to the input of MOSFET is active, the output of all AND gates is logic 0 and this operation mode occurs when the EN_H signal is logic 0 and the EN_L signal is logic 1.

In the case where the EN_H signal is logic 1 and the EN_L signal is logic 1, the output of a third (IC1C) AND gate becomes logic 1 with delay and the rising edge of the PWMH_drive signal is shifted forward as long as this delay time since a first (Q2) transistor slowly turns off while the PWM signal is active; and when the PWM signal is passing to the passive state, a second (Q1) transistor in conduction mode enters to a late cut off mode and the other input of a second (IC1B) AND gate whose first input is logic 1, becomes logic 1 with delay so that the rising edge of the PWML_ drive signal is delayed as long as this delay time and dead time addition is performed in the zero crossing region of the output current.

In this dead time circuit: a first resistor (R1) is connected to the gate of the MOSFET element (M1) and a second resistor (R2) is connected to the drain end; and the (PWM) signal is applied to the MOSFET (M1) via the first resistor (R1); and the VCC signal is applied to the drain gate of the MOSFET (M1) via the second resistor R2; and an input pin of a first AND gate (IC1D) is connected between the MOSFET (M1) and the second resistor (R2); and a third resistor (R3) is connected to the other input (shown by 13 in FIG. 3) of this first AND gate (IC1D) and the resistor (R3) is grounded from its other end; and an EN_L signal is also applied to this input; and the output of the first AND (IC1D) gate is connected to the first input pin of a second AND gate (IC1B) and further a first NPN transistor (Q2) is connected to the output of the first AND gate via another resistor (R5); and the collector terminal of this transistor (Q2) is supplied with VCC voltage by another resistor (R7) and the emitter terminal is grounded; and a first input of a third AND gate (IC1C) is connected to the collector terminal of this first transistor (Q2); and on the other hand a PWM signal is applied to the first pin of a fourth AND gate (IC1A) and the EN_H signal is applied to the second pin; and the second pin is further connected to ground by another resistor (R4); and the second input pin of the third AND gate (IC1C) is connected to the output of this fourth AND gate, and a second NPN type transistor (Q1) is connected to this output via another resistor (R6); and the collector of this second transistor (Q1) is also connected to the Vcc voltage by another resistor (R8), and the emitter of this second transistor (Q1) is also connected to ground; and the second input pin of the second AND gate (IC1B) is connected to the collector of this second transistor (Q1); and in this circuit, the output of the third AND gate represents the PWMH_ signal, ie the driving signal to be applied to a power electronic switch in an application circuit; and the output of the second AND gate represents another drive signal PWML_ to be applied to another switch in the same application circuit.

The invention is also an other dead time control circuit, using the aforementioned PWMH signal wherein the above-described method (100) is used, wherein this circuit consists of the following for the application of this method: a parallel connected resistor and diode (224) group of whose input is applied with PWMH signal and whose output is connected both to a capacitor and to a "+" end of a comparator; the "−" end is connected to a power supply of such comparator, an AND gate of whose one pin is connected to the output of the comparator via a NOT gate, the other pin is connected to the PWML signal and a PWML_ signal is received from this AND gate and also for setting dead time to a rising edge of a gate signal in the power electronics application circuit, when PWMH is active in this circuit, capacitor charges over diode fastly, when PWMH is not active, it discharges over resistor slowly; PWML_ signal is not generated until the voltage value of the capacitor drops below the voltage source value connected to the negative input of the comparator while the capacitor is discharged and therefore the rising edge of the PWML signal is delayed as duration of dead time.

The invention is also an other dead time control circuit, using the aforementioned PWMH signal wherein the above-described method (100) is used, wherein this circuit consists of the following for the application of this method: a parallel connected resistor and diode (224) group of whose input is applied with PWML signal and whose output is connected both to a capacitor and to a "+" end of a comparator; the "−" end is connected to a power supply of such comparator, an AND gate of whose one pin is connected to the output of the comparator via a NOT gate, the other pin is connected to the PWMH signal and a PWMH_ signal is received from this AND gate and also for setting dead time to a rising edge of a gate signal in the power electronics application circuit, when PWML is active in this circuit, capacitor charges over diode fastly, when PWML is not active, it discharges over resistor slowly; PWMH_ signal is not generated until the voltage value of the capacitor drops below the voltage source value connected to the negative input of the comparator while the capacitor is discharged and therefore the rising edge of the PWMH signal is delayed as duration of dead time.

Thanks to the developed dead time method, problems of overflow of the current due to dead time and inability to keep the frequency constant are largely solved. The developed method is very simple and can be easily implemented with digital or analog circuits.

BRIEF DESCRIPTION OF THE DRAWINGS

FIG. 1: are topological views of the circuit.

FIG. 4: are the dead time control circuits.

DESCRIPTION OF THE REFERENCES IN THE FIGURES

Figure 1A:
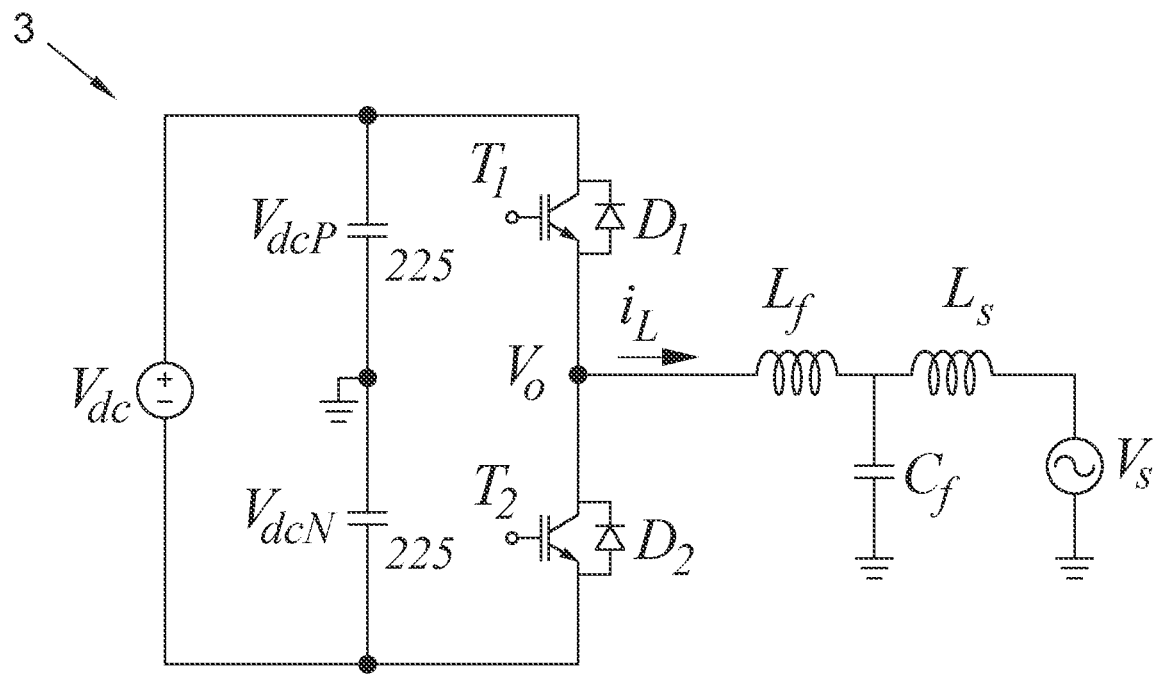
FIGS. 1a and 1b: topological views of the circuit of which the subject method of the invention is applied in two different embodiments. The invention is applied to two level voltage sourced inverter in these embodiments (Application circuit).

For comprehensibility of the invention, the parts in the attached figures have been individually numbered and corresponding definitions are provided below.

1. Invention circuit
2. Dead time control circuit
2' Dead time control circuit
2" Dead time control circuit
3. Application circuit
10. Processor
   121. Comparator
   122 DAC
   123 Flip Flop
   211 AND gate
   212 NOT gate
   221 Resistor
   222 Transistor
   223 MOSFET
   224 Diode
   225 Capacitor
   226 Comparator
Y: Load
$V_s$: Grid voltage
$L_f$: Filter inductance of inverter output
$C_f$: Filter capacitor
$L_s$: Filter inductance of the grid
$D_1$ and $D_2$: Diodes
$T_1$ and $T_2$: Switches
ADC: An Analog-Digital Converter
CAP: CAPTURE unit
DSP: Digital Signal Processing unit
Analog HCC: Analog Hysteresis Current Control
100. Dead time control method

DETAILED DESCRIPTION OF THE INVENTION

An invention circuit (1) and a dead time control circuit (2 or 2') are used in the method according to the invention. PWM, PWMH, PWML and EN_L, EN_H signals, which are going to be used at the input of the dead time circuit (2 or 2'), are generated with the invention circuit (1). On the other hand, PWMH_ and PWML signals, which are going to be applied to power electronics converters, for example to a two level voltage sourced inverter, are generated in the dead time circuit (2 or 2').

Application circuit (3) comprises a diode ($D_1$) to which an upper switch ($T_1$) is parallel connected and a diode ($D_2$) to which a lower switch ($T_2$) is parallel connected. At the output of the application circuit (3). which is a two level half bridge inverter topology, grid voltage ($V_s$) and filter components ($L_f$, $C_f$, $L_s$) as to be filter inductance of inverter output ($L_f$), filter capacitor ($C_f$) and filter inductance of the grid ($L_s$) are provided. Ground of the grid voltage ($V_s$) is connected to the middle point of DC link capacitors (225) which are serial connected at the input. DC input voltage is converted to AC voltage ($V_o$) at the output via power elements. $V_o$ voltage of the output of the inverter, which is in the form of square wave, is converted into sinusoidal form with filter elements and the energy is transmitted to grid voltage ($V_s$).

Invention circuit (1) is composed of a processor (10) and two AND gates (211) to which the processor (10) is connected with a NOT gate (212).

The processor (10) comprises an analog and a digital part. Digital Signal Processing (DSP) and digital control is provided at the digital part. The processor (10) comprises at least one comparator (121), at least one DAC (Digital-Analog Converter) (122) and at least one Flip Flop (123). The analog part comprises two comparators (121) and an SR flip flop (123) connected to these comparators (121). The analog part is the section realizing analog HCC in the processor. Controlling of the phase arm is provided with the analog part. The PWM signal comes from the output of the SR flip flop (123). EN_H (VP) and EN_L (VN) signals are generated via calculating hysteresis band in the processor (10). Driving signals (PWMH_ and PWML_) which is stated in the method is provided at the output of the dead time circuit (2, 2' and 2"). Developed dead time circuit can be applied not only with analog elements but also can be provided using FPGA (Field Programmable Gate Array) or CPLD (Complex Programmable Logic Device).

Dead time control circuit (2) comprises 4 AND gates (211), 2 NPN transistors (222), 1 MOSFET (223) and resistors (221). In this circuit (2); a first resistor (R1) (221) is connected to the gate port of the element MOSFET (223) (M1) and a second resistor (R2) (221) is connected to the drain port of the MOSFET (223) (M1). PWM signal is applied to the MOSFET (M1) (223) via the first resistor (R1). VCC signal is applied to the drain port of the MOSFET (M1) (223) via the second resistor (R2) (221). One input pin (Indicated with the number 12 in FIG. 3) of a first AND gate (IC1D) (211) is connected in between MOSFET (M1) (223) and the second resistor (R2). A third resistor (R3) (221) is connected to the other input pin (indicated with the number 13 in FIG. 3) of this first AND gate (IC1D) (211) and resistor (R3) (221) is grounded from its other end. Furthermore, EN_L signal is applied to this input pin (13). First input pin (4) of a second AND gate (IC1B) (211) is connected to the output of this first AND gate (IC1D). Also a first NPN transistor (Q2) (222) is connected to the output of the first AND gate (211) via another resistor (R5) (221). VCC voltage is given to collector terminal of this transistor (Q2) (222) via yet another resistor (R7) (221). Emitter terminal is grounded. First input pin (10) of a third AND gate (IC1C) (211) is connected to the collector terminal of this first transistor (Q2) (222).

On the other hand, in this circuit (2), PWM signal is applied to the first pin (1) of a fourth AND gate (IC1A) (211). EN_H signal is applied to the second pin (2) as well. This second pin is also connected to the ground via another resistor (R4) (221). Second input pin (9) of the third AND gate (IC1C) is connected to the output (3) of this fourth AND gate (211). Also a second NPN type transistor (Q1) (222) is connected to this output (3) via another resistor (R6) (221). Collector of this second transistor (Q1) (222) is connected to VCC voltage via again another resistor (R8) (221). Emitter of this second transistor (Q1) (222) is again connected to the ground. Second input pin (5) of the second AND gate (IC1B) (211) is connected to the collector of this second transistor (Q1) (222).

Figure 1B:
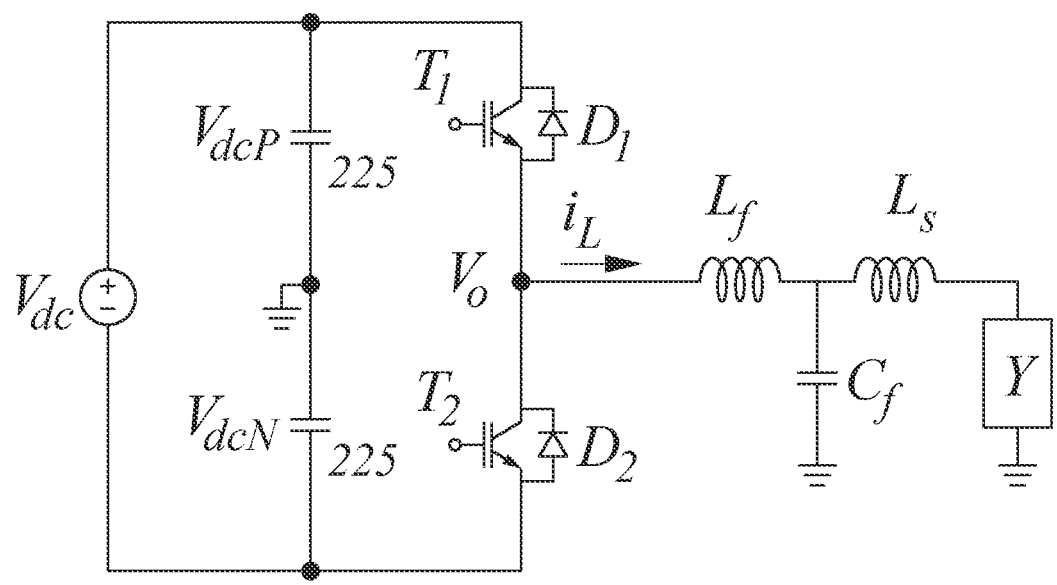
Figure 2:
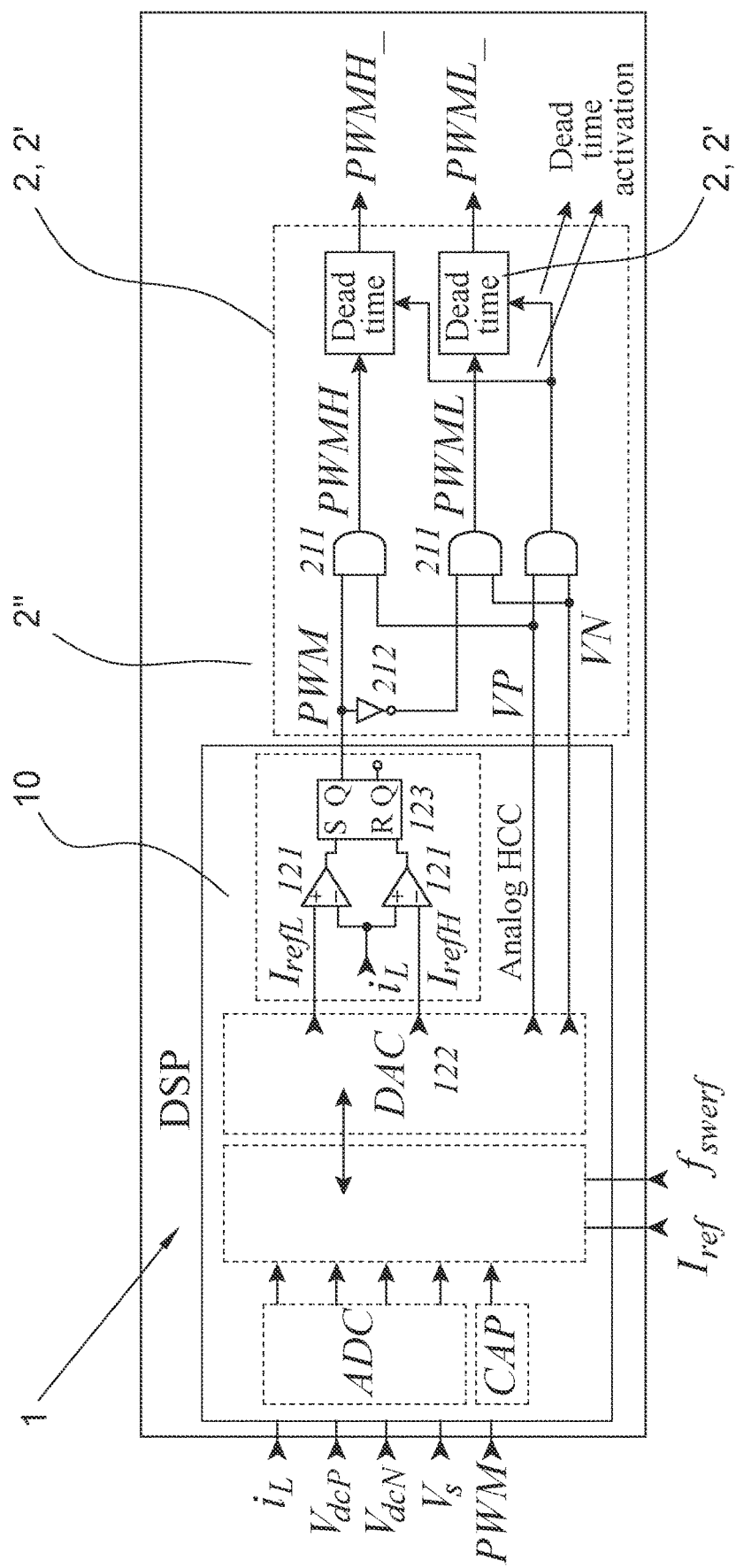
FIG. 2: is the schematic diagram showing the generation of pulse wide regulated signals and the application of generated signals to a dead time control circuit in the circuit subject to invention. The signals of which the pulse wide is regulated are: the signals of PWM (Pulse-Width Modulation), EN_L (i.e.: VN) and EN_H (i.e.: VP). With this circuit the signals of PWMH (Pulse-Width Modulation High), PWML (Pulse-Width Modulation Low) are generated as well.

In this circuit (2), the output (8) of the third AND gate (211) represents PWMH_ signal. The output (6) of the second AND gate (211) represents PWML_ signal. These two signals (PWMH_ and PWML_) are applied as the gate signals (gate signals of $T_1$ and $T_2$ switches of FIG. 1) to the power electronics element (for example two level voltage sourced inverter) of the application circuit (3) (FIG. 1).

Figure 3:
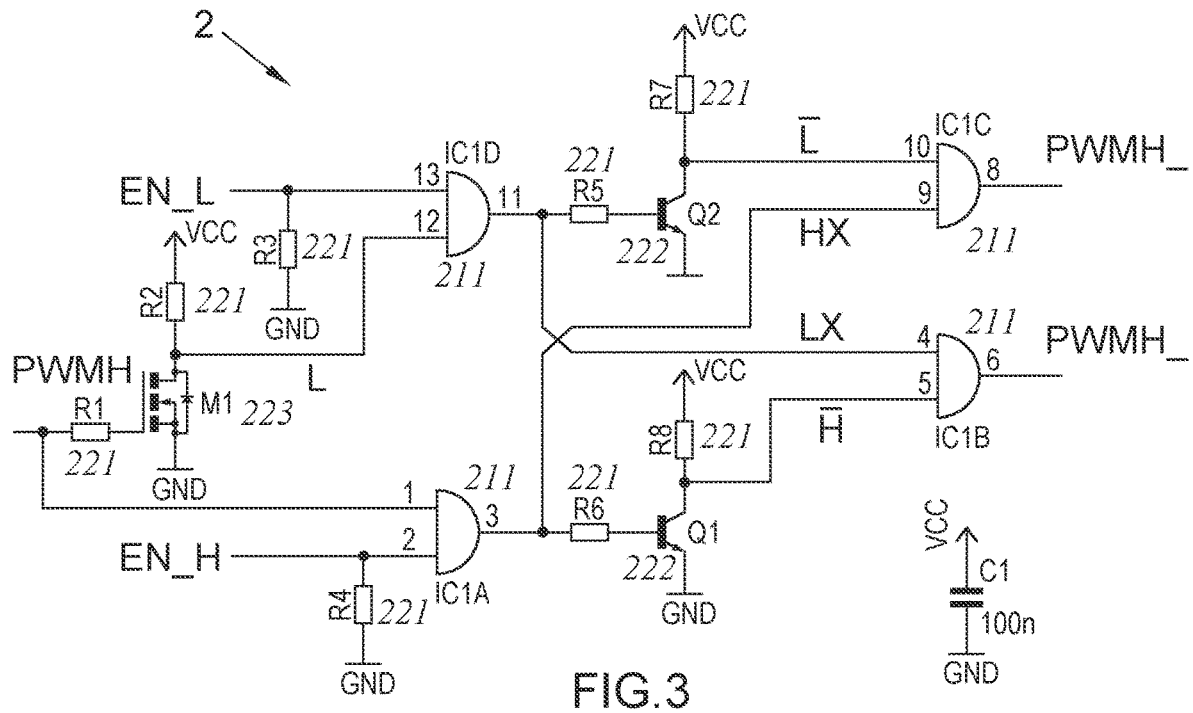
FIG. 3: is the dead time control circuit according to the invention.

Numerations of input and output pins of the elements presented in the dead time circuit (2") of FIG. 3, are independent from the references presented above in the parts list.

In FIG. 3, PWM, EN_L (i.e. VN) and EN_H (i.e. VP) signals are generated in the processor (10). After producing signals with the processor (10), the dead time control circuit (2") works as follows: In the state of EN_H(VP) signal is active and EN_L(VN) signal is passive (i.e. the major part of positive half period of output current), before being used of the dead time circuit (2) as the invention circuit, when PWM signal generated in the processor (10) is active, MOSFET (223) turns on and both input signals of the AND gate (IC1D) (211), using EN_L signal as input, become logic 0 as well. Therefore, the output of this AND gate (IC1D) (211) is 0. As a result of this, the transistor Q2 (222) remains in cut off mode and one input of the AND gate (IC1C) (211) becomes logic 1. On the other hand, since the output of the IC1D which is logic 1, is directly used as input of IC1B, one input of the IC1B becomes logic 1 as well, wherein IC1D is the first AND gate (211) and IC1B is the second AND gate (211). And now if we turn to the AND gate (211) in the name of IC1A: since PWM is active, one input of this AND gate (211) is logic 1 and its other input is logic 1 since EN_H is active. As a result, the output of IC1A is logic 1. Therefore, HX is also logic 1 and the output of the IC1C is high since both two inputs of the third AND gate (211) in the name of IC1C is logic1, and this signal is used as the gate signal of upper switch of the two level inverter. On the other hand, since the output of the AND gate (211) in the name of IC1A is logic 1, the transistor Q1 (222) turns on and the other input of the AND gate (211) in the name of IC1B becomes logic 0. Thus, the output of the AND gate IC1B is logic 0 and signal is not applied to the lower switch of the two level inverter. If PWM signal is not active, output of all AND gates (211) are logic 0 and the gate signals (gate signals of $T_1$ and $T_2$ switches in FIG. 1) are not active. This working principle realizes in the case of EN_H=1 and EN_L=0.

Let's examine the case of EN_H=0 and EN_L=1 (i.e. the major part of negative half period of the output current). If the PWM signal is not active, both inputs of AND gate IC1D (211) are logic 1 and the output of this AND gate (211) becomes logic 1. As a result, the transistor Q2 (222) turns on and one of the inputs of the AND gate IC1C (211) becomes logic 0. IF the other input of the AND gate (211) IC1C (211) is named as HX, this HX input is logic 0, since the output of the AND gate IC1A (211) is logic 0. Thus, at the output of the AND gate IC1C (211), logic 0 signal is provided. This signal is the signal of upper switch ($T_1$) of the inverter and this means the gate signal (PWMH_) of the upper switch ($T_1$) is not active. On the other hand, since output of the AND gate IC1A (211) is logic 0, the transistor Q1 (222) is in cut off and one input of the AND gate IC1B (211) becomes logic 1. If the other input of the AND gate IC1B (211) is named as LX, this LX input is also logic 1, since the output of the AND gate IC1D (211) is logic 1. As a result, the output of the AND gate IC1B (211) becomes logic 1 and in this case, gate signal (PWML_) of the lower switch ($T_2$) of the inverter becomes active. IF PWM signal becomes active, output of the all AND Gates (211) become logic 0 and in this case, gate signals of none of the switches will not be active. This working principle realizes in the case of EN_H=0 and EN_L=1.

Finally let's examine the case of EN_H=1 and EN_L=1 (i.e. around the zero crossing zone of the output current) In here we should state specifically the following situation. Since getting the Q1 and Q2 transistors (222) in the cutoff mode are slow, this function is used as adding dead time in the present invention. If we clarify working principle for this range: if PWM signal is active, MOSFET (M1) (223) turns on and one input of the AND gate IC1D (211) becomes logic 0. As a result, the output of the AND gate IC1D is logic 0. Since both two inputs of the AND gate IC1A (211) is logic 1, its output is logic 1. If the PWM signal is not active, MOSFET (M1) (223) gets in cut-off state and both two inputs of the AND gate IC1D (211) are logic 1 and its output is logic 1. As to one input of the AND gate IC1A (211) is logic 0, the output of it, is logic 0. Active and passive states of PWM signal results in as such. One more time, let's check the active state of PWM signal. The condition of being active of the PWMH_ signal, to be applied to the upper switch ($T_1$) in the inverter of FIG. 1, is possible when the two inputs of the AND gate IC1C (211) are logic 1. In here, the condition of adding dead time for PWMH_ signal, is provided using the characteristic of transistor Q2 (222) which gets into cut-off state slowly wherein the transistor Q2 (222) was in conduction state before. Since the transistor Q2 (222) gets into cut-off state slowly, the output of the AND gate IC1C (211) becomes logic 1 with delay and the rising edge of PWMH_ signal is delayed forwardly as long as the duration of this delay time. Likewise, when the PWM signal passes into passive state, the transistor Q1 (222) which is in conduction state, will turn off lately and the other input of AND gate IC1B (211), whose one input is logic 1, will become logic 1 with delay. Therefore, the rising edge of PWML_ signal will be delayed as long as this delay. Thus, process of adding dead time of the output current, at the zero crossing zone is provided in this way.

The method subject to invention (100) works as following steps.

Reading the DC link voltage, output current and grid voltage by sensors (101),

Converting the analog voltage and current values that are read to digital values with an ADC (102), Calculation of the hysteresis band by digital part of the processor (10) for adaptive hysteresis current control and updating the band value at each sampling time (103), Calculation of the IrefH and IrefL values using the hysteresis band and Iref (103a), Generating of the PWM signal by digital part of the processor (10) according to the hysteresis band (104), After generating PWM signal, generating two auxiliary control signals taking into account of the positive and negative regions of the lower and upper bands (IrefL and IrefH) of the current reference, i.e. generating the first one of the auxiliary control signals (VP) when upper band (IrefH), is in positive state and generating the second one of the auxiliary control signals (VN) when lower band (IrefL) is in negative state (105), Not applying negative signal in the region where current (Iref) is positive and thereby without applying dead time, only applying positive signal without delay (106).

Likewise, not applying positive signal in the region where current (Iref) is negative and thereby, only generating negative signal without dead time (107), In the region where first auxiliary control signal (VP) is logic 1 and second auxiliary control signal (VN) is logic 1 and when upper band (IrefH) of the current is positive and lower band of the current is negative, generating signals via setting dead time between upper and lower signals and switching all the switches ($T_1$ and $T_2$) (108).

The steps of 102, 103, 104, 105 are processed by processor (10) in the method (100) subject to invention.

Furthermore, frequency is measured via reading the PWM signal by CAPTURE (CAP) unit in the method (100) subject to invention.

The process of measuring the frequency via reading the PWM signal by a CAPTURE (CAP) unit is executed for measuring the frequency and to see the result of the method.

In the step of 103, 2 comparators (121), a DAC (Digital Analog Converter) (122) and 1 SR flip flop (123) are used for applying adaptive hysteresis current control. In the preferred embodiment, these components are located in the processor (10). The step 103 is executed by the processor (10). How the calculation of the step 103 is provided, is defined below:

In order to solve the variable frequency problem of classical hysteresis control, it is a must to control the band. So as to make the switching frequency constant, the requirement for controlling the band is described on the FIG. 9.

Figure 9:
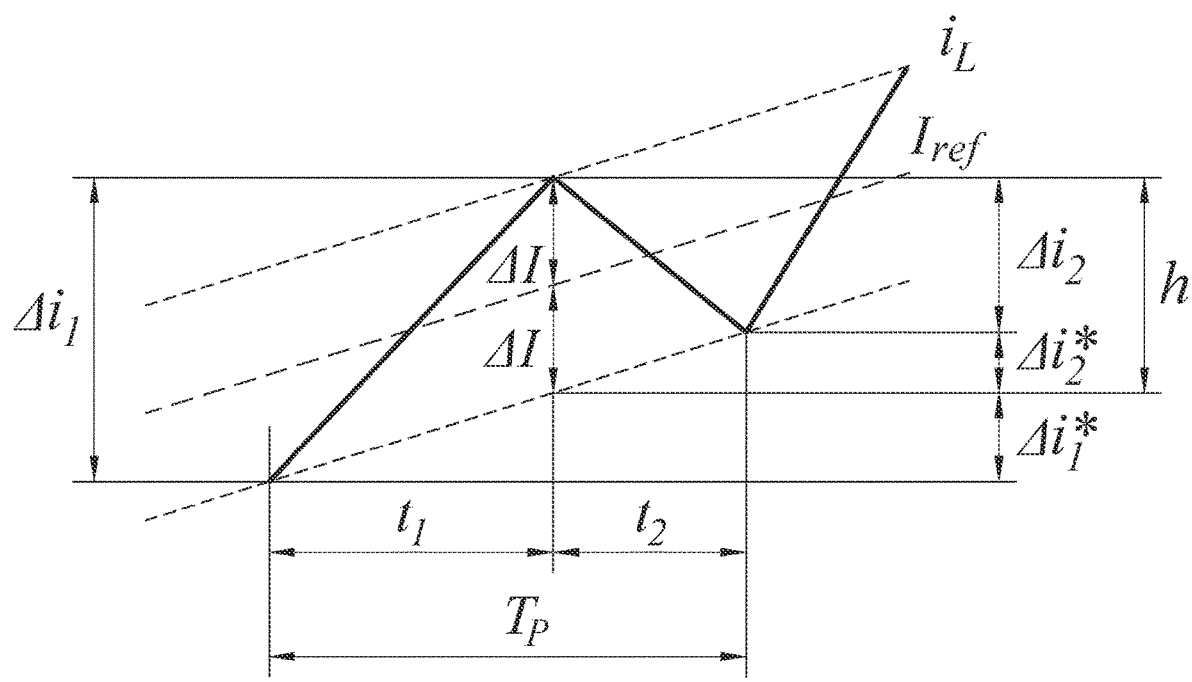
FIG. 9: The variable definitions for the controlling of hysteresis current control with constant frequency.

The band value providing the switching frequency to be constant, is obtained mathematically using definitions indicated in FIG. 9. The variables used in the band calculation are listed below:

$T_p$: Switching period
$t_1$: conduction duration of the upper switch
$t_2$: turn off duration of the upper switch and conduction duration of the lower switch at the same time
$\Delta i_1$: the increase of the inductance current in $t_1$ time
$\Delta i_2$: the decrease of the inductance current in $t_2$ time $\frac{di^*}{dt}$:

derivative of reference of current
$\Delta i_1$: the increase of the reference of current in $t_1$ time
$\Delta i_2$: the increase of the reference of current in $t_2$ time ΔI: Hysteresis band
h: Fluctuation amount in current
$m_1$: slope of inductance current in $t_1$ time
$m_2$: absolute value of slope in inductance current in $t_2$ time
$m_{ref}$: slope of current reference In order to find h value for a constant period/frequency; in the equilibrium of $T_p = t_1 + t_2$; $t_1$ and $t_2$ time can be written in terms of $m_1$, $m_2$ and $m_{ref}$ slopes and circuit parameters. The increase amount in the inductance current in $t_1$ range is obtained as follows:

$$\Delta i_1 = h + \Delta i_1^* \quad (1)$$

$$\Delta i_1 = \frac{di_L}{dt} t_1 = m_1 t_1 \quad (2)$$

$$m_1 = \frac{V_L(t_1)}{L} = \frac{V_{dcP} - V_s}{L} \quad (3)$$

The change amount of the current reference in $t_1$ range is found as follows:

$$\Delta i_1^* = \frac{di^*}{dt} t_1 = m_{ref} t_1 \quad (4)$$

The following equilibriums are obtained using the equilibriums (1) and (4).

$$m_1 t_1 = h + m_{ref} t_1 \quad (5)$$

$$t_1 = \frac{h}{m_1 - m_{ref}} \quad (6)$$

A similar way is used for obtaining $t_2$.

$$h = \Delta i_2 + \Delta i_2^* \quad (7)$$

$$\Delta i_2 = \frac{di_L}{dt} t_2 = m_2 t_2 \quad (8)$$

$$m_2 = -\frac{V_L(t_2)}{L} = \frac{V_{dcN} + V_s}{L} \quad (9)$$

Is obtained. The change amount of the current reference in $t_2$ range is as follows:

$$\Delta i_2^* = \frac{di^*}{dt} t_2 = m_{ref} t_2 \quad (10)$$

Via using (7), (8) and (10):

$$h = m_2 t_2 + m_{ref} t_2 \quad (11)$$

$$t_2 = \frac{h}{m_2 + m_{ref}} \quad (12)$$

Is obtained. Total period is calculated using the equilibriums (6) and (12).

$$T_p = t_1 + t_2 \qquad (13)$$

$$T_p = \frac{h}{m_1 - m_{ref}} + \frac{h}{m_2 - m_{ref}} \qquad (14)$$

From here, hysteresis band for a constant period is:

$$h = \frac{T_p \cdot (m_2 + m_{ref}) \cdot (m_1 - m_{ref})}{m_1 + m_2} \qquad (15)$$

obtained as ΔI=h/2. Via adding this obtained band value to the current reference, the upper band value is obtained; and via deducting this obtained band value from the current reference, the lower band value is obtained.

A processor unit (10), for example a microprocessor can be used in the step 104, for generating PWM signal.

Figure 10:
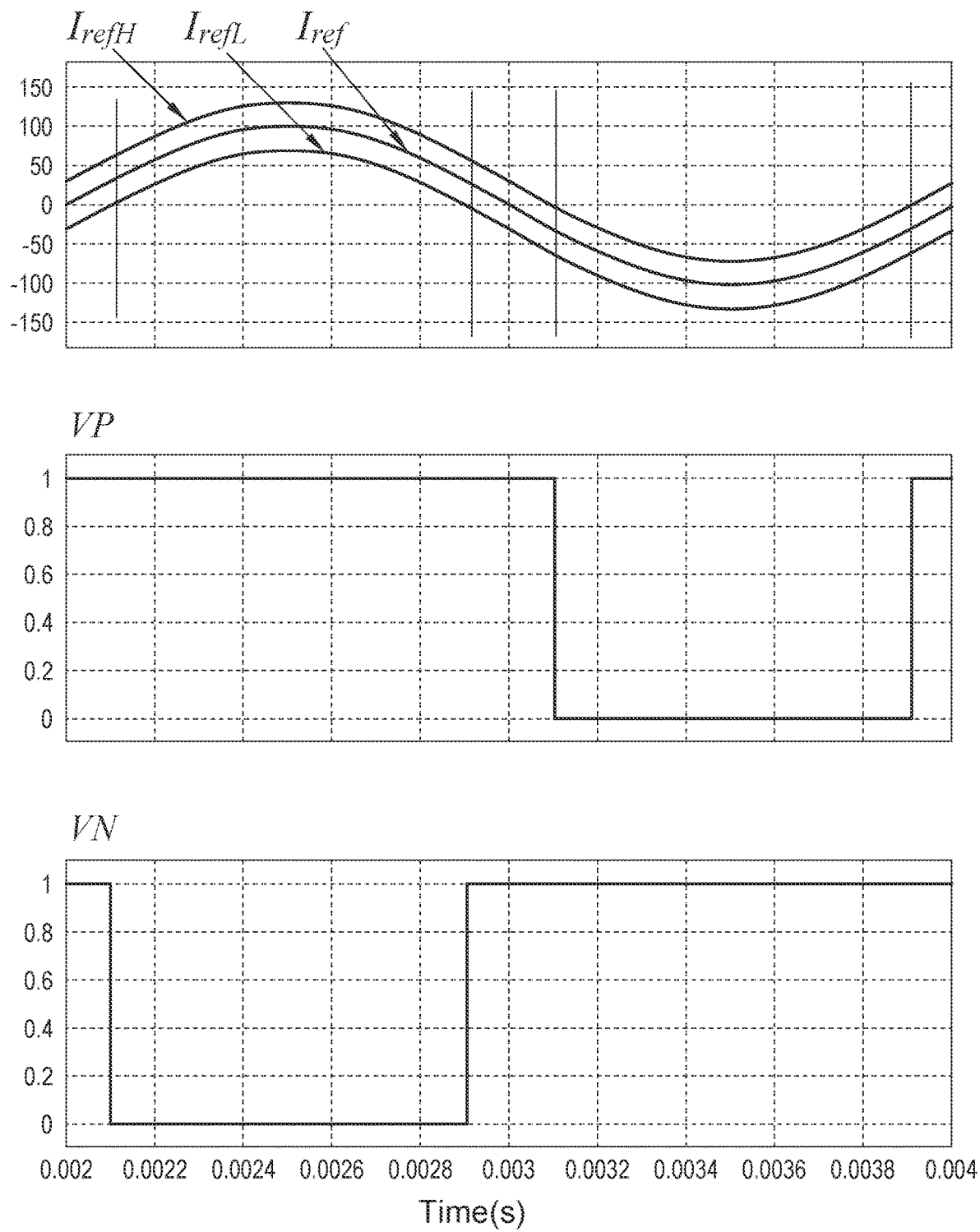
FIG. 10: Generation of VP and VN auxiliary control signals.

Control signals generated in the step 105 are indicated in FIG. 10 as VP and VN signals.

After generating PWM signal in the step 105 in the method (100) subject to invention, firstly two auxiliary control signal are produced as VP and VN showed in FIG. 10, taking into account the regions wherein lower band (IrefL) and upper band (IrefH) of the current reference are positive and negative. VP signal represents the positive state of the upper band (IrefH). In other words, the signal VP is the signal which is logic 1 when the upper band is positive and logic 0 when the upper band is negative. VN signal represents the negative state of the lower band (IrefL). In other words, the signal VN is the signal which is logic 1 when the lower band is negative and logic 0 when the lower band is positive. The aim of these signals is not applying negative signal in the region where the current is positive and thereby only applying positive signal without setting dead time and without delay. Likewise, positive signal will not be applied in the region where current is negative, only negative signal will be generated without dead time. In other words, when the upper current reference (IrefH) is positive, due to the reason that only upper switch ($T_1$) and lower diode ($D_2$) will be in conduction, dead time is not added to the signal of upper switch ($T_1$) and signal is not applied to the lower switch ($T_2$). Likewise, when the lower current reference (IrefL) is negative, due to the reason that only lower switch ($T_2$) and upper diode ($D_1$) will be in conduction, dead time is not added to the driving signal of lower switch ($T_2$). When upper band of the current (IrefH) is positive and the lower band (IrefL) of it is negative, the signals are generated via setting dead time in between lower and upper signals. Thanks to the dead time generated in this way, overflowing outside the band is prevented and holding the frequency constant is possible.

If the signal of the current becomes both positive and negative within the switching period, dead time will be set between the signals and both switches will be switched. This region (i.e., the region where VP=logic 1 and VN=logic 1, or the region in which the EN_H=logic 1 and EN_L=logic 1 in the dead time circuit (2) according to the invention) corresponds to the region where the current change is not very fast. Therefore, no significant overflow occurs in this range and the last generated gate signals are applied to the switches ($T_1$ ve $T_2$). (It is applied to the output of the dead time circuit (2, 2', 2") of FIG. 3 or FIG. 4 and to the application circuit (3) of FIG. 1.

In the present invention, the processor (10) further generates VP and VN signals and upper (IrefH) and lower (IrefL) band values. These upper and lower band values (IrefH, IrefL) are obtained by adding and subtracting the bandwidth value to the current reference (Iref) wherein the bandwidth value is found by calculation. In adaptive hysteresis current control, this band value is calculated and updated at each sampling period. Thus, a variable band value is obtained within one period of the current reference. Thus, the frequency is kept constant. The method according to the invention can also be applied to constant hysteresis band current control. However, since the frequency is desired to be constant in the applications, adaptive hysteresis current control with constant frequency is sampled in this specification. The analog part of the processor is the unit which performs the classical hysteresis current control. When the output current passes the upper band (IrefH), PWM becomes 0 (PWM=0) while PWM becomes 1 (PWM=1) when the current passes the lower band (IrefL). Thus, VP, VN and PWM signals are generated by processor (10). PWMH and PWML signals are obtained thanks to the method of the invention. However, in the zero crossing region of the output current, both VP and VN become logic 1. In this case, both the upper ($T_1$) switch and the lower ($T_2$) switch are actively used in the application circuit (3). In this case, dead time must be added to the rising edges of the switches. However, this dead time has no adverse effect on the method of the invention in current control.

In the other dead time circuits (2' and 2") (which are also used in the simulation) to which the method (100) is applied, the dead time addition process to the rising edge of the gate signal is performed with the structure composed of resistor (221), capacitor (225) and diode (224). Equivalent two different dead time circuit (2' and 2") are used for upper and lower switches.

Figure 4A:
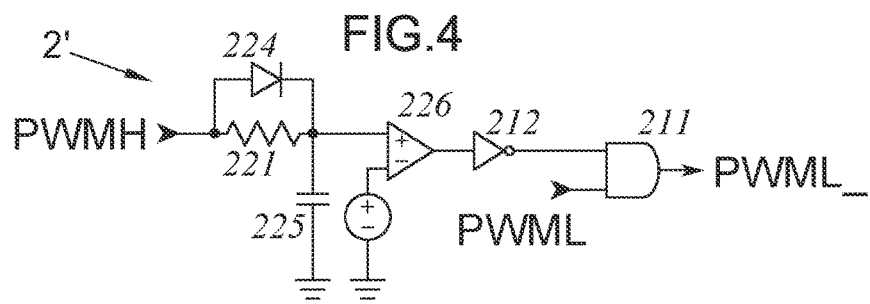
FIGS. 4a and 4b: are the other dead time control circuits in which the subject method of the invention is applied.
Figure 4B:
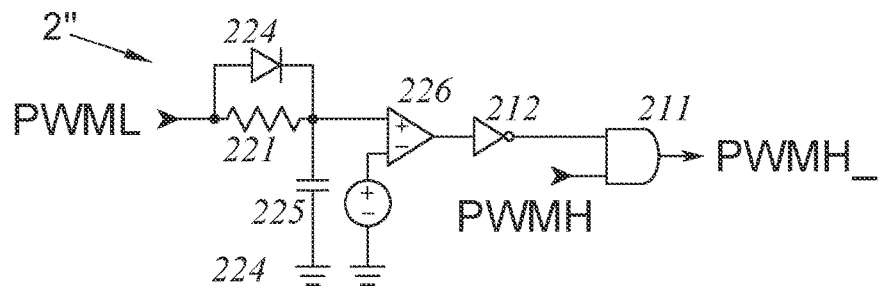
Figure 5:
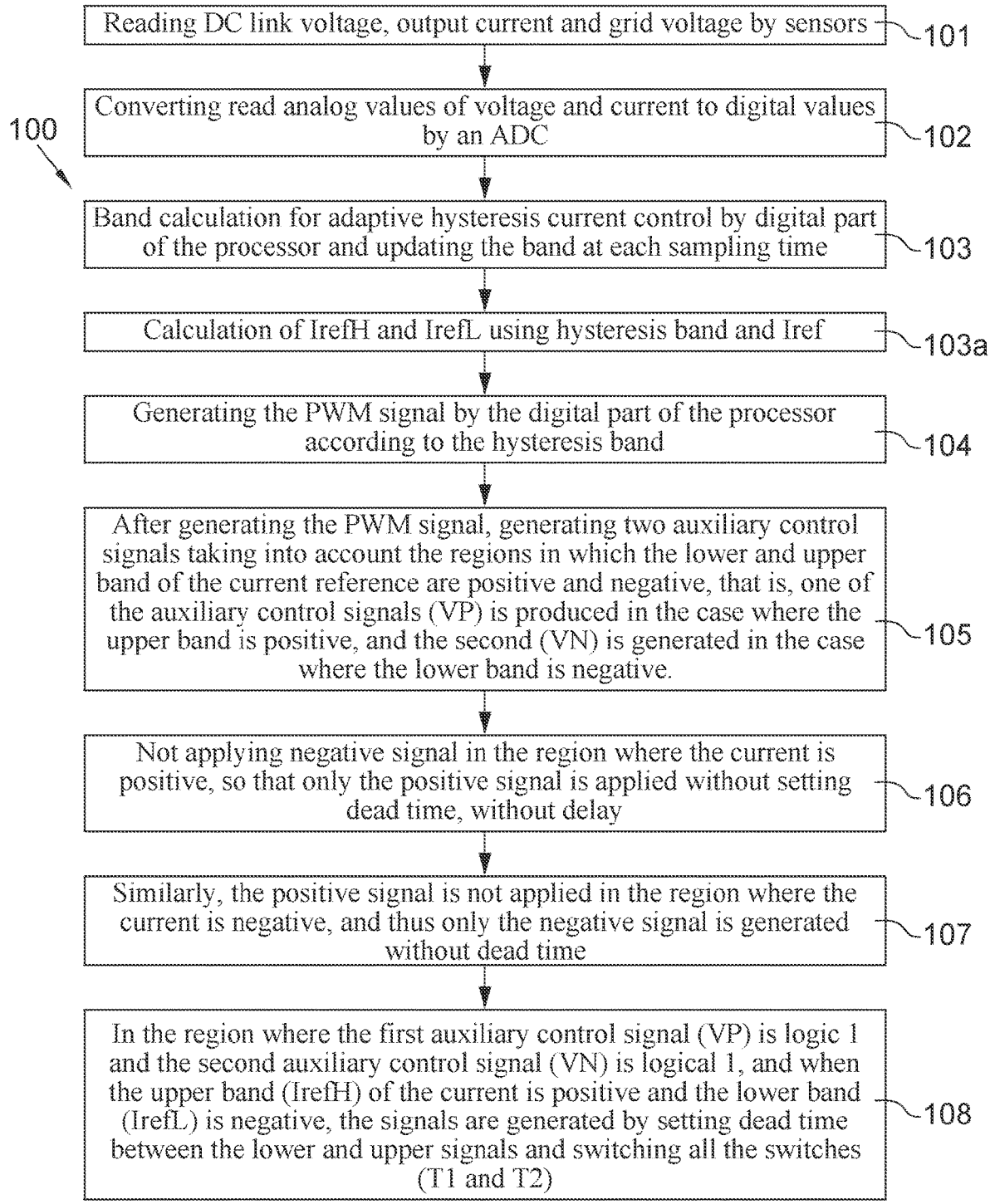
FIG. 5: is the flow chart of the dead time control method according to the invention.
Figure 6:
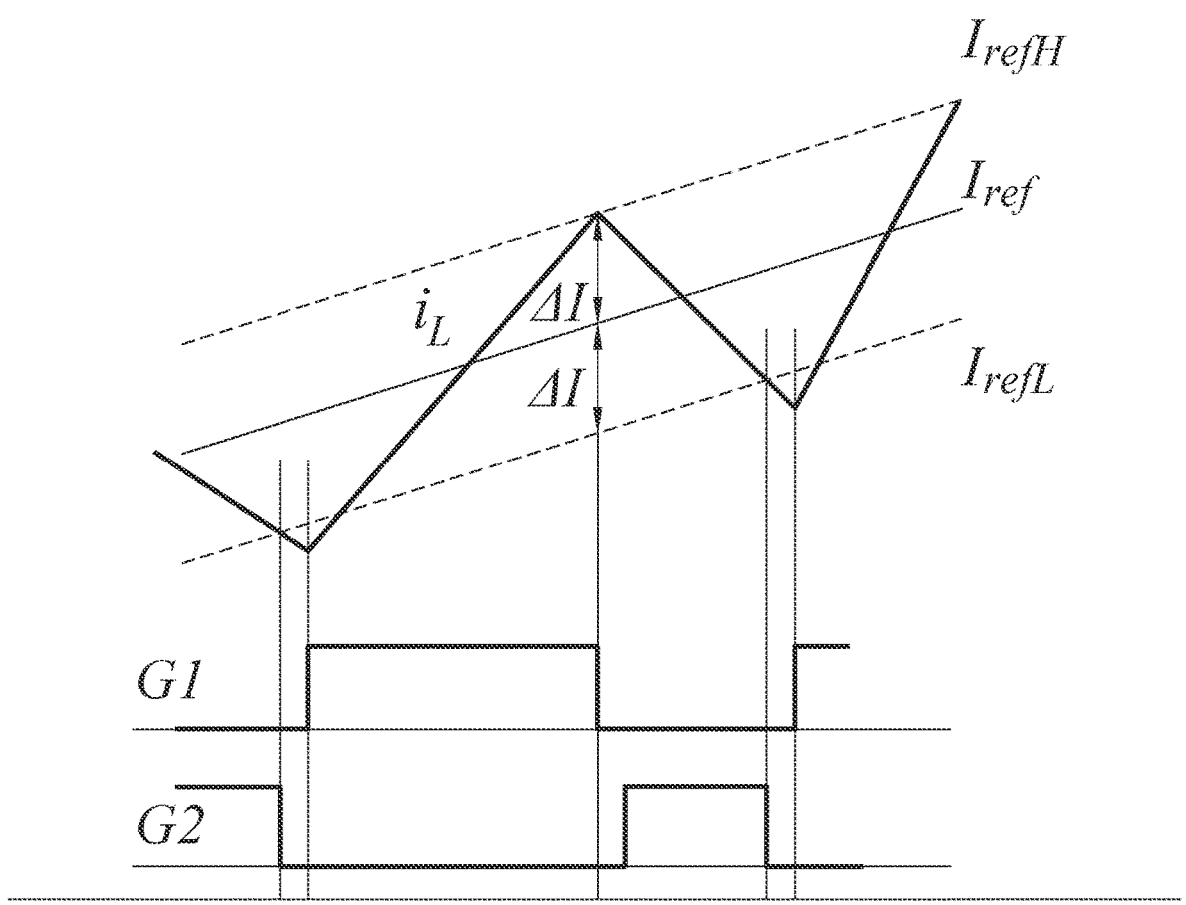
FIG. 6: is the graph showing the driving signals and current change in the hysteresis current control method in the conventional method in the prior art.
Figure 7:
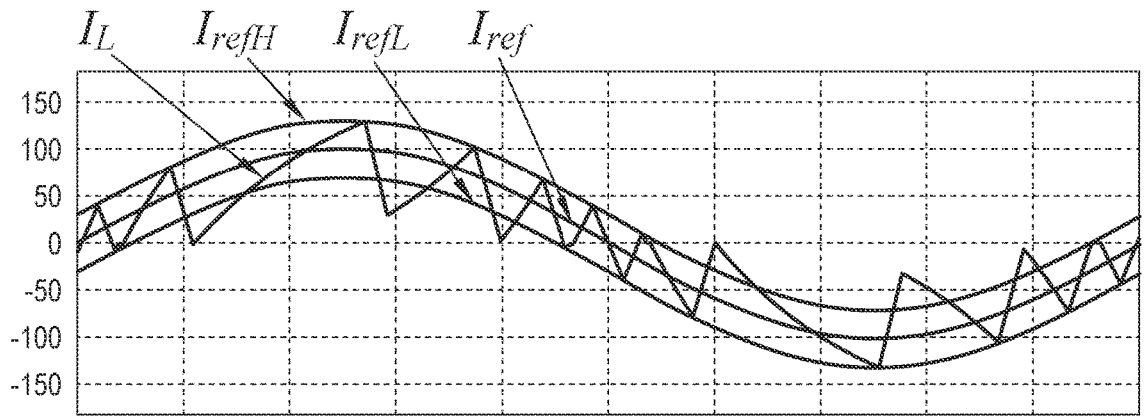
FIG. 7: is a graph showing the state that the current cannot be retained in the band due to the effect of dead time when a constant hysteresis band is used in the conventional method (in the prior art), that is, the state where the current flows out from the band.
Figure 7:
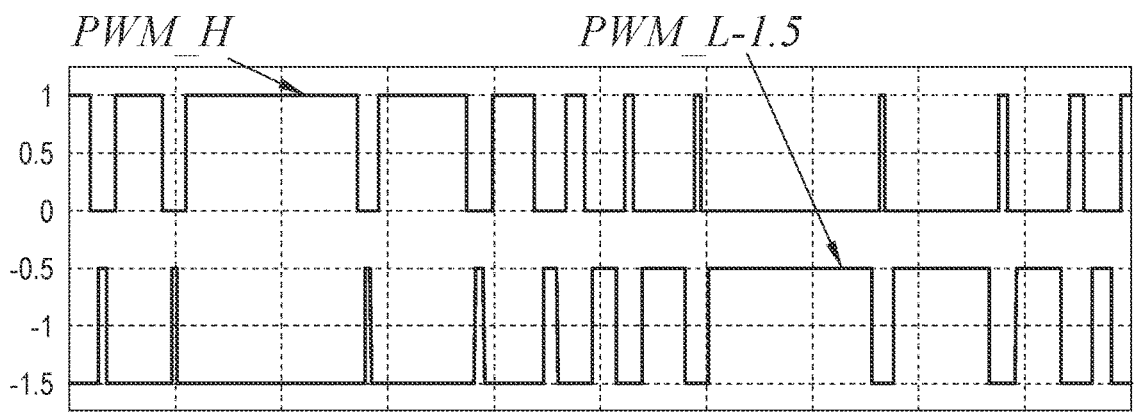
Figure 7:
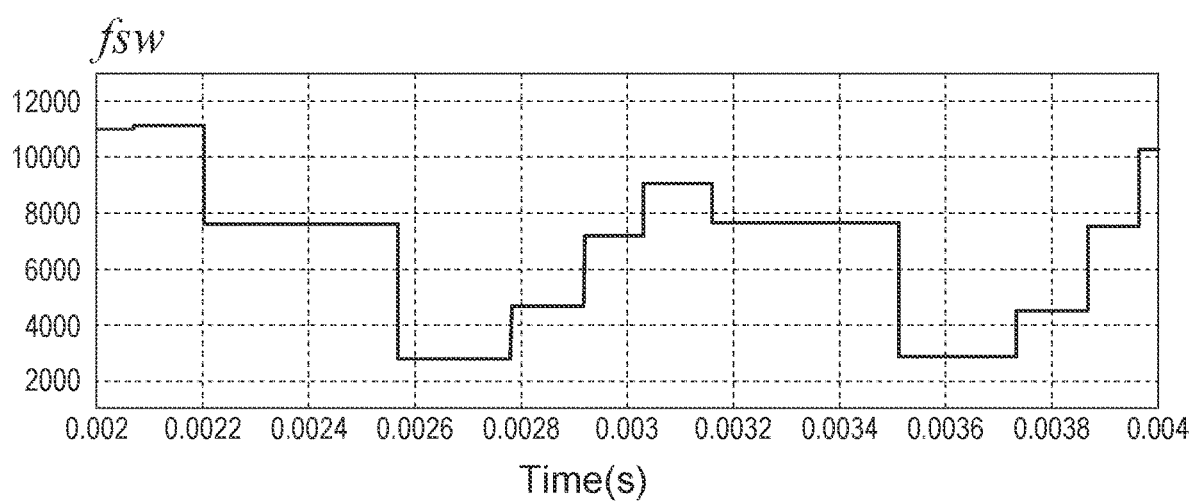
Figure 8:
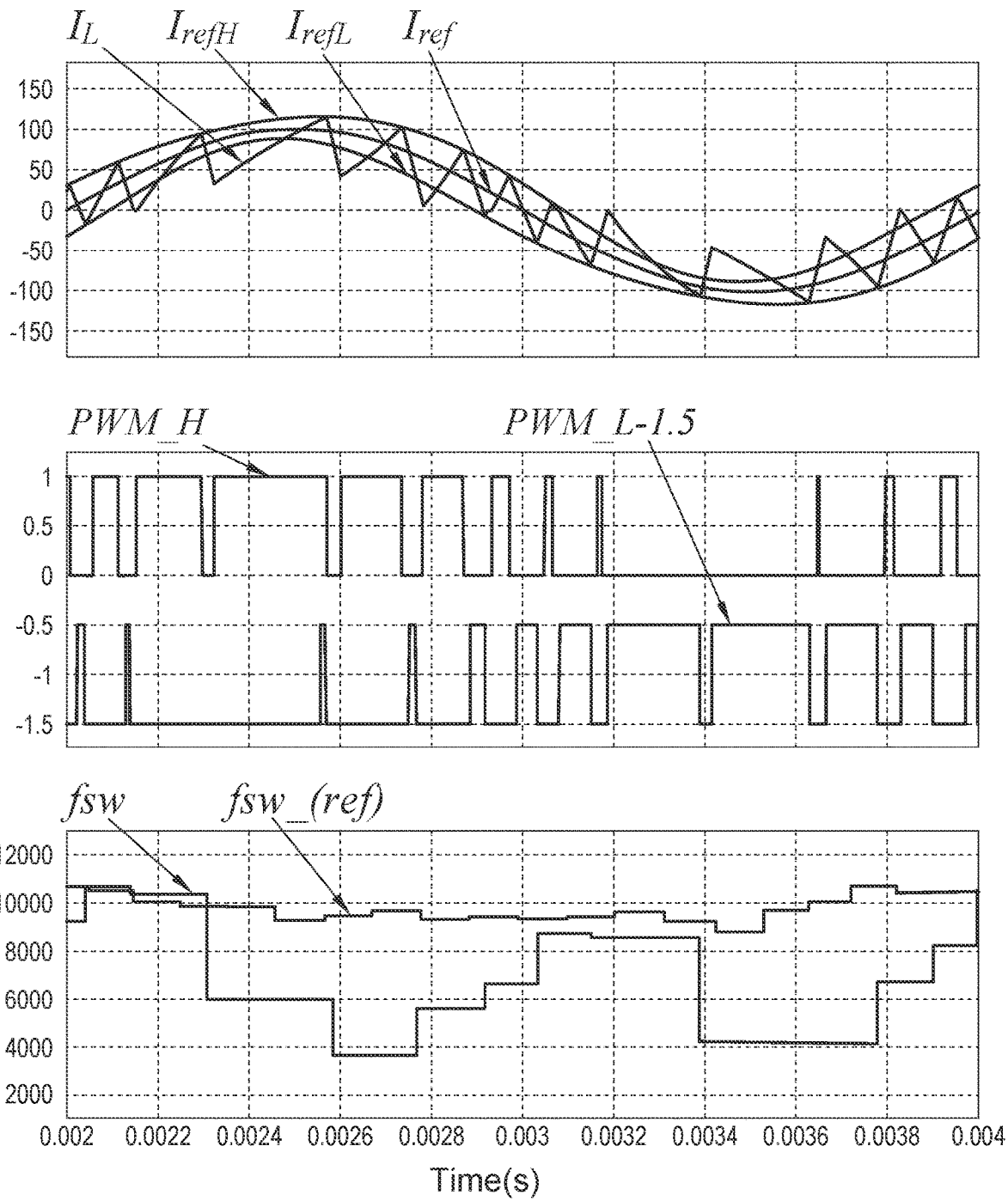
FIG. 8: In the conventional method (in the prior art), when the adaptive (i.e. variable) hysteresis band is used, it is the graph showing the state that the current cannot be retained within the band i.e. the state that the current flows over the band due to the dead time effect.

The dead time circuit (2') of FIG. 4-*a* comprises a parallel connected resistor (221) and a diode (224). PWMH signal is applied to this group. The output of the group consisting of this resistor (221) and diode (224) is connected to both a capacitor (225) and the + end of a comparator (226). The − end of the comparator (226) is connected to a power source. The power supply is grounded. The output of the comparator (226) is connected to a NOT gate (212) and the output of the NOT gate (212) is connected to an input of an AND gate (211). The other input of this AND gate (211) is provided with a PWML signal. The PWML_ signal is received from the output of this AND gate (211).

The dead time circuit (2") of FIG. 4-*b* comprises a resistor (221) and a diode (224) connected in parallel. PWML signal is applied to this group. The output of the group consisting of this resistor (221) and diode (224) is connected to both a capacitor (225) and the + end of a comparator (226). The − end of the comparator (226) is connected to a power source. The power supply is grounded. The output of the comparator (226) is connected to a NOT gate (212) and the output of the NOT gate (212) is connected to an input of an AND gate (211). The PWMH signal is provided to the other input of this AND gate (211). The PWMH_ signal is received from the output of this AND gate (211).

The dead time circuit (2') in FIG. 4-*a* works as follows: The PWML_ signal is applied to the lower switch ($T_2$) in the application circuit (3). In order of this signal to be active, both inputs of the AND gate with the number 211 (211) must be logic 1. PWML refers to a signal without dead-time. Our aim is to shift the rising edge of this signal as the duration as dead time. So this signal is already logical 1. For the other input of AND gate (211) to be logic 1, the output of comparator (226) must be active. There is a constant voltage supply in the negative input of comparator (226). The positive input of comparator (226) is the voltage of the capacitor (225). This capacitor is rapidly charged via diode (224) when PWMH is active, and slowly discharged via resistor (221) when PWMH is not active. While the capacitor (225) is discharged, the PWML_ signal is not generated until the voltage value of the capacitor (225) falls below the value of the voltage source connected to the negative input of the comparator (226). Thus, the rising edge of the PWML signal is delayed as long as the dead time. A similar process is performed in the other dead time circuit (2") of FIG. 4-*b* to generate the PWMH_ signal. As a result, the gate signals of the switches ($T_1$, $T_2$) are thus obtained.

Figure 11:
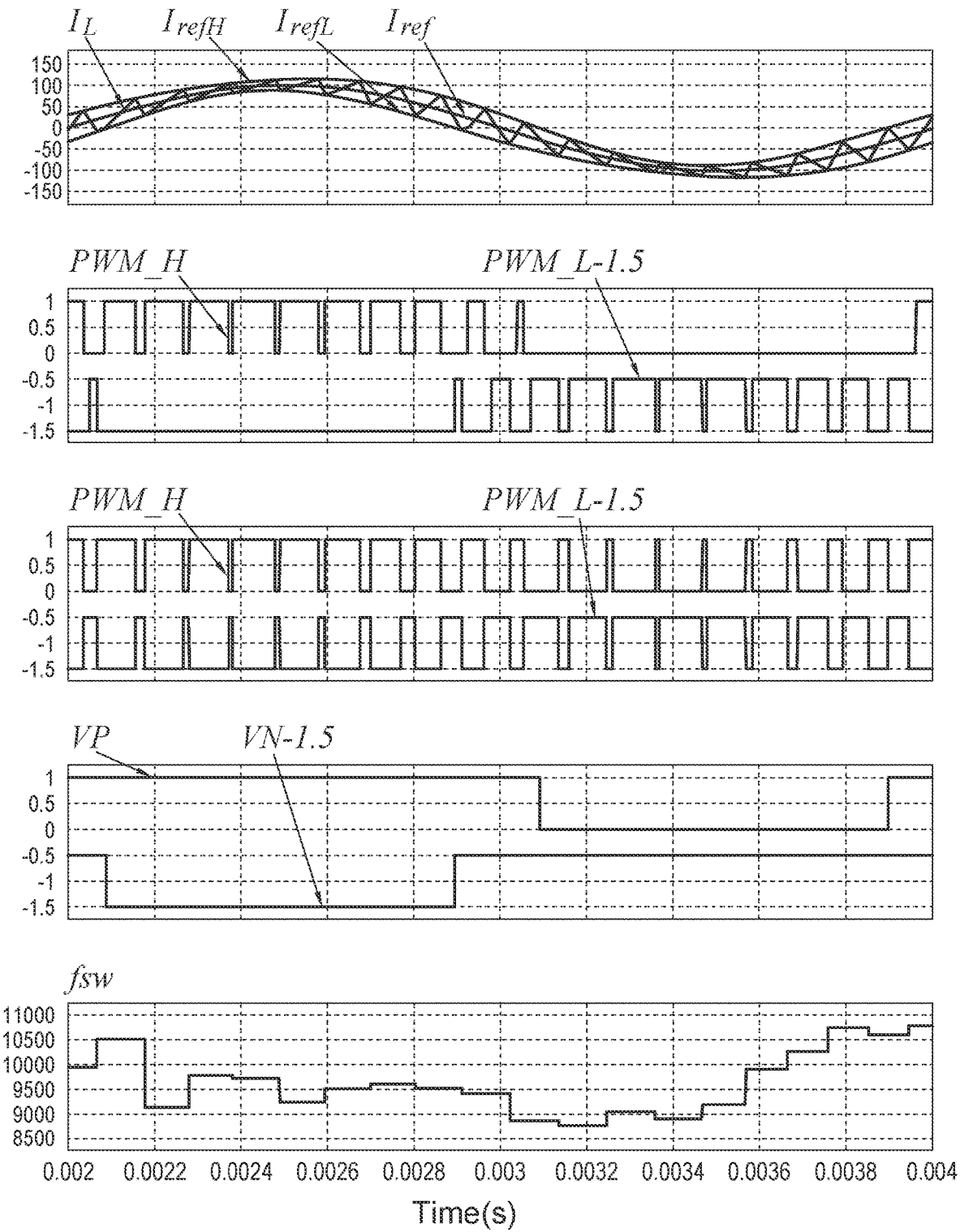
FIG. 11: When fsw_ref=10 kHz, it is the simulation results while dead time prevention is active.

When there is no dead time, the frequency change obtained by simulation is indicated by fsw. The received simulation results are indicated in FIG. 11 in the case when the desired reference switching frequency as to be constant, in other words the frequency at which the user wants to work is fsw_ref=10 kHz and when the dead time method is active. In here, the fluctuation in the switching frequency appears to be very low. In this embodiment, the method (100) is applied to two-level single-phase voltage sourced inverters. It has been shown that dead time problems are significantly reduced by this way. The developed method (100) can also be applied to three-level inverters and other power electronics converters.

The invention is not limited to the embodiments described above, and the person skilled in the art can easily introduce different embodiments of the invention. They should be considered within the scope of the invention as claimed by the claims.

The invention claimed is:

1. A dead time control method to keep the switching frequency constant, for hysteresis current control in power electronics converters, comprising the steps (100) of;
    converting the DC link voltage, output current and output voltage to digital values with an ADC (Analog to Digital converter) (102);
    calculating the hysteresis bandwidth value for adaptive hysteresis current control using the values read by the ADC and updating the bandwidth value by recalculating it, in each sampling time (103),
    calculation of the IrefH and IrefL values of the upper and lower bands of the current reference using the calculated hysteresis bandwidth value of the step 103 and Iref (103*a*),
    generating the PWM signal by hysteresis current control (104),
    generating two auxiliary control signals as VP, VN (105), wherein in this step (105) these auxiliary control signals (VP, VN) are generated taking into account the regions in which the lower and upper band of the current reference (i.e. IrefL and IrefH) are positive and negative,
    applying, in the region where VP=1 and VN=0, the drive signal of $T_1$ without setting dead time and not applying the drive signal of $T_2$ wherein $T_1$ is the conduction duration of an upper switch and $T_2$ is the turn off time of said upper switch and is the conduction duration of a lower switch, (106),
    applying, in the region where VP=0 and VN=1, the driving signal of $T_2$ without setting dead time and not applying the driving signal of $T_1$ (107), and
    applying the driving signals of $T_1$ and $T_2$ by setting dead time in the region where VP=1 and VN=1 (108).

2. The method (100) according to claim 1, wherein the hysteresis bandwidth is calculated in step "Calculating the hysteresis bandwidth value for adaptive hysteresis current control using the values read by the ADC and updating the bandwidth value by recalculating it, in each sampling time (103)", according to the formula of:

$$h = \frac{T_p \cdot (m_2 + m_{ref}) \cdot (m_1 - m_{ref})}{m_1 + m_2}$$

and $\Delta I = h/2$ wherein $T_p$ is the switching period, $\Delta I$ is the hysteresis band, h is the amount of fluctuation in the current, $m_1$ is the slope of the inductance current within time t1, $m_2$ is the absolute value of the slope of the inductance current within time t2; $m_{ref}$ is the slope value of the current reference.

3. The method (100) according to claim 1, wherein the upper and lower bands of the current reference (IrefH and IrefL) in the step "Calculation of the IrefH and IrefL values of the upper and lower bands of the current reference using the calculated hysteresis bandwidth value of the step 103 and Iref (103*a*)", are calculated via adding the calculated bandwidth value to the current reference to obtain the upper band value; and via deducting the calculated bandwidth value from the current reference, to obtain the lower band value.

4. The method (100) according to claim 1, wherein the first of the auxiliary control signals (VP) is generated in case the upper band (IrefH) is positive and the second of the auxiliary control signals (VN) is generated in case the lower band (IrefL) is negative in the step (105) of generating two auxiliary control signals VP, VN.

5. A dead time control circuit (2 or 2' or 2') for application of a method (100) according to claim 1, comprising
    a processor (10) converting the read analog values of the voltage and current into digital values; calculating the hysteresis bandwidth value and updating the bandwidth value via recalculating it in each sampling time; generating upper and lower band values (IrefH, IrefL) using the calculated hysteresis bandwidth via adding and subtracting the hysteresis bandwidth value to/from the current reference (Iref), generating the PWM signal relative to the hysteresis bandwidth; generating two auxiliary control signals, as one of which is VP when the upper band IrefH is positive and the other is VN when the lower band IrefL is negative and
    a logic circuit and a simulation circuit (1) generating driving signals of PWMH_ and PWML_.

6. The dead time control circuit (2) according to claim 5, comprising and gate (211), transistor (222), MOSFET (223) and resistors (221).

7. The dead time control circuit (2' or 2") according to claim 5, which is composed of FPGA and/or CPLD and/or DAC and/or comparator and/or logic elements.

8. The dead time control circuit (2' or 2") according to claim 5, comprising resistors (221), capacitor (225), diodes (224) and a NOT gate (212).

9. The dead time control circuit (2) according to claim 5, comprising 4 and gates (211), 2 NPN transistors (222), 1 MOSFET (223) and at least 8 resistors (221).

* * * * *